United States Patent
Hogenkamp

[11] Patent Number: 6,042,079
[45] Date of Patent: *Mar. 28, 2000

[54] DEVICE FOR VIBRATION ISOLATION

[75] Inventor: Detlef Hogenkamp, Wetzlar, Germany

[73] Assignee: Mikroskopie Und Systeme GmbH, Wetzlar, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/896,834

[22] Filed: Jul. 18, 1997

[30] Foreign Application Priority Data

Jul. 18, 1996 [DE] Germany ............ 196 28 974

[51] Int. Cl.⁷ ................................. F16M 13/00
[52] U.S. Cl. ..................... 248/550; 188/378; 248/638
[58] Field of Search ........................ 248/550, 638, 248/631; 188/378, 379, 380; 318/649, 135, 623, 600, 448; 335/4; 333/104, 232, 262

[56] References Cited

U.S. PATENT DOCUMENTS

| | | | |
|---|---|---|---|
| 4,057,212 | 11/1977 | Schubert | 248/358 |
| 4,134,542 | 1/1979 | Sugiura | 236/13 |
| 4,328,941 | 5/1982 | Phillips et al. | 248/550 |
| 4,477,045 | 10/1984 | Karasawa et al. | 248/1 |
| 4,483,425 | 11/1984 | Newman | 188/378 |
| 4,610,546 | 9/1986 | Intraub | 366/110 |
| 4,730,541 | 3/1988 | Greene | 91/362 |
| 4,810,966 | 3/1989 | Schmall | 324/207 |
| 4,850,261 | 7/1989 | Greene | 91/362 |
| 5,018,701 | 5/1991 | Masaki et al. | 248/631 |
| 5,067,648 | 11/1991 | Garnjost | 248/550 |
| 5,180,958 | 1/1993 | Choshitani et al. | 318/623 |
| 5,219,143 | 6/1993 | Staple et al. | 248/550 |
| 5,356,110 | 10/1994 | Eddy | 248/550 |
| 5,366,198 | 11/1994 | Dickinson | 248/550 |
| 5,379,980 | 1/1995 | Houghton, Jr. et al. | 248/550 |
| 5,387,851 | 2/1995 | Nuscheler et al. | 318/135 |
| 5,467,067 | 11/1995 | Field et al. | 335/4 |
| 5,467,068 | 11/1995 | Field et al. | 335/4 |
| 5,551,360 | 9/1996 | Qui | 112/470.01 |
| 5,640,995 | 6/1997 | Packard et al. | 137/597 |
| 5,653,317 | 8/1997 | Wakui | 188/378 |
| 5,734,246 | 3/1998 | Falangas | 318/649 |
| 5,765,800 | 6/1998 | Watanable et al. | 248/550 |

FOREIGN PATENT DOCUMENTS

| | | |
|---|---|---|
| 0 410 647 B1 | 7/1990 | European Pat. Off. . |
| 2 344 570 | 4/1974 | Germany . |
| 37 18 630 | 12/1987 | Germany . |
| 39 30 612 C2 | 9/1989 | Germany . |
| WO 91/05201 | 4/1991 | WIPO . |

OTHER PUBLICATIONS

Von H. de Boer et al., "Ein Schwingungsisolierter Messtisch mit Niveau–Regelung", Feinwerktechnik & Messetechnik, vol. 88, (1980), pp. 233–236.

Barry–Isolair–Luftfedern, Barry Controls International.

J. Partosch, Der Fluistor—Ein Revolutionaerer Aktor.

Axel Klimmek, VDI Progress Reports, "Modeling and Testing a Pneumatic Vibration Insulation With Digital Control to Optimize the Restore Performance," No. 159, pp. 20–23, 1991.

Axel Klimmek, Doctoral Work, "Modeling and Testing a Pneumatic Vibration Insulator With Digital Control to Optimize the Restore Performance," front cover, 1991.

*Primary Examiner*—Derek J. Berger
*Assistant Examiner*—Tan Le
*Attorney, Agent, or Firm*—Foley & Lardner

[57] ABSTRACT

A device for the vibration isolation with level control of an object with respect to a base, having a pneumatic spring and a completely mechanically decoupled control loop comprising a position sensor which operates in a contact-free manner, an electronic controller and an electrically controllable flow valve allowing a contact-free level control with adjustable control parameters.

13 Claims, 2 Drawing Sheets

DEVICE FOR VIBRATION ISOLATION

FIELD OF THE INVENTION

The invention relates to a novel device for the vibration isolation of an object with respect to a base, having a pneumatic spring and a sensor for determining the distance between the object and the base.

BACKGROUND OF THE INVENTION

Vibration-sensitive measurement and test equipment require active or passive vibration isolation and damping. Thus, a device for vibration isolation must isolate shaking or vibrations of generally low amplitudes at an installation site from the measurement equipment. Also, such device is intended to dampen vibrations which are inherent to the equipment and which occur, for example, after a change in the load or the movement of mobile parts, and mostly have large amplitudes and low frequencies. In many applications, it is additionally necessary to compensate for load changes in the equipment by means of level control.

Commercially available pneumatic springs with level control are available for these requirements. These springs comprise a pneumatic spring for vibration isolation, a leveling screw for fixing the desired level of the object and a control loop with a pneumatic control valve for level control.

U.S. Pat. No. 4,057,212 describes, for example, such vibration isolation with level control using pneumatic spring elements and is incorporated by reference, herein. An adjustable, spring-preloaded leveling screw serves to set the level of the object. The leveling element is fastened, on the one hand, to the vibration-isolated object and, on the other hand, to the base. The conventional principle of vibration isolation is described in more detail below.

An object which is to be isolated from ground-borne vibrations and requires level control is usually fitted, for example, on a base plate, which rests on four pneumatic springs with level control. Since the position of the object is statically determined using three bearing points, it is possible for there to be only three control loops. For this reason, two pneumatic springs with level control are combined in terms of control equipment to form a single unit. By means of these three control loops, the position of the object, for example a measuring device or a microscope, is kept constant.

The use of pneumatic springs provides active, low-frequency vibration isolation in the event of ground-borne shaking. Good damping in the event of vibration inherent to the equipment is likewise achieved.

The pneumatic spring operates by using a volume of air as a compressible medium and a specially designated diaphragm to limit the volume of air. The air pressure required in the spring is dependent on the loading applied. For simple applications, the pneumatic springs are inflated by means of an air pump. In such systems, it is necessary to check the air pressure from time to time. For more complicated systems, the pneumatic springs are continuously connected to the compressed-air network. The desired air pressure is set at a fixed value via a restrictor valve using a manometer and an adjusting screw.

Schematically, the pneumatic spring comprises a lower part, an upper part, and a resilient air cushion situated between them. The lower part is positioned on a base, for example the floor of the building. The object which is to be isolated from the vibrations of the base is placed on the upper part.

In the event of displacements of a load on the object, the weight and pressure distribution change. Therefore the originally set level of the object changes as well. If this is undesirable, pure vibration isolation level control is required as an additional function. For this purpose, a level of the object above the base is determined. If the level at one of the measurement points changes owing to a displacement of a load on the object, this deviation is corrected by increasing or lowering the air pressure in the pneumatic spring assigned to the measurement point. The supply and removal of air are controlled by means of the level-control valve.

A valve lifter of a pneumatic level-control valve serves to determine the level between the object and the base. The pneumatic level-control valve is incorporated in the compressed-air feed line of the pneumatic spring and is mounted vertically from the outside at the base of the pneumatic spring. The valve lifter is arranged vertically and connected to the pneumatic level-control valve and is preloaded by a return spring. At the top, the return spring projects out of the pneumatic level-control valve. The position of the valve lifter controls the amount of compressed air fed to the pneumatic spring.

The desired level of the object mounted in an isolated manner can be set by means of an adjustable reference. To this end, a leveling screw is mounted vertically above the pneumatic level-control valve on the upper part of the pneumatic spring. After the pneumatic spring has been loaded by placing an object thereon, the leveling screw is rotated to set a desired level until its upper edge makes contact with the underside of the mounted object. The lower edge of the leveling screw is mechanically connected to the upper edge of the valve lifter arranged beneath it.

The level of the object is controlled by means of the pneumatic level control valve. To this end, the distance of the object from the base is determined by the valve lifter, which in this case operates as a mechanical gap sensor. Owing to the mechanical spring preloading, the valve lifter is in continuous flexible mechanical contact with the lower edge of the leveling screw arranged above it.

If the weight above an associated pneumatic spring rises due to a displacement of the load on the object, the valve lifter is forced downwards. As a result, a compressed-air feed line in the valve is opened, so that the pressure in the pneumatic spring rises and, as a result, the object is lifted. Under the influence of the return spring, the valve lifter follows until a desired level is reached and the compressed-air feed line is closed. If the weight above the pneumatic spring is reduced and the object is lifted, the valve lifter follows and thus opens an air discharge line, via which the air pressure in the pneumatic spring is reduced until the object has fallen back to the desired level and the valve lifter has closed the air discharge line. The pneumatic level-control valve thus balances the air pressure in the pneumatic spring as a function of the respective position of the valve lifter such that the level set by the leveling screw is restored.

The main drawback of the system lies in the use of a mechanical gap sensor in the form of the valve lifter. Due to the contact between valve lifter and leveling screw, the pneumatic level-control valve represents a mechanical coupling between the object mounted in a vibration-damped manner and the base of the pneumatic spring. Such coupling bridges the low-frequency pneumatic spring in the manner of a mechanical bypass.

Furthermore, the mass of the valve lifter and its return spring represent an oscillatory system which, in the event of external excitation (e.g., rapid rhythmic changes in load), can execute its own vibrations. This then leads to continual changes in height of the object applied.

Moreover, the control parameters of the level-control loop cannot be influenced by the user. In some cases, it is desirable to change the magnitude of the volumetric flow or response times, for example, if, owing to an unfavorable geometric arrangement of the bearing points, the independently operated control loops can affect one another and result in instability of the system, i.e., they can the build-up oscillation, or cause the vibration decoupling to become blocked.

The problems identified above are not intended to be exhaustive but rather are among many which tend to reduce the performance of the vibration isolation system. Other problems may also exist. However, those presented above should be sufficient to demonstrate that currently known solutions are amenable to worthwhile improvement.

SUMMARY OF THE INVENTION

Accordingly, it is an object of the present invention to provide a device for vibration isolation of the generic type which ensures that the base and the object to be vibration-damped are mechanically decoupled and have a level adjustment with adjustable control parameters.

Other objects and features of the present invention will become apparent with reference to the accompanying drawings and detailed description of the invention.

To achieve these objects and in accordance with the purpose of the invention, as embodied and broadly described herein, the device for vibration isolation of the present invention comprises a device for vibration isolation of an object, comprising: a pneumatic spring, a contact-free gap sensor, a controller, and an air flow valve comprising an electrically controllable actuator, wherein the contact-free gap sensor senses a displacement of the object and outputs a signal to the controller, the controller actuates the electrically controllable actuator thereby controlling the air flow to the pneumatic spring and correcting the displacement.

It is a further object of the invention to provide a device for the vibration isolation of an object with respect to a base, comprising: a pneumatic spring, a gap sensor determining a distance between the object and the base, wherein the gap sensor operates in a contact-free manner and having a gap sensor output signal, an electronic controller, driven by the gap sensor output signal and has a controller output signal, and an electrically controllable flow valve, driven by the controller output signal, incorporated in the compressed-air feed line of the pneumatic spring, wherein the gap sensor, the electronic controller, and the electrically controllable flow valve are arranged as a control loop.

Further advantageous refinements of the invention form the subject matter of the dependent claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

The invention is based on the idea of combining a gap sensor operating in a contact-free manner with an electrically controllable flow valve and an electronic controller in one control loop. By selecting and driving the electronic controller, the amount of air allowed through can be influenced in the electrically controllable flow valve. The choice of flow valve is of particular importance here. Only actuators are suitable as electrically controllable flow valves. An actuator is understood generally to mean a component which converts electrical signals into physical parameters, for example, pressure or force. Actuators are used in control loops as final control elements.

A thermopneumatic actuator is selected here to control the flow. Depending on the application, the use of piezoelectric actuators, electrostatic actuators, or bimetallic actuators is also possible. Piezoelectric actuators are very small and very quick, but can only control small flow quantities or pressures. Electrostatic actuators do not operate proportionally in small designs, but do have short reaction times. Bimetallic actuators are small and act proportionally, but are relatively slow and are only suitable for low pressures and flow rates.

By comparison, the thermopneumatic actuator provides the widest range of applications. It operates as a true proportional valve and permits precise and highly dynamic control performance even at high supply pressures.

Figure 2:
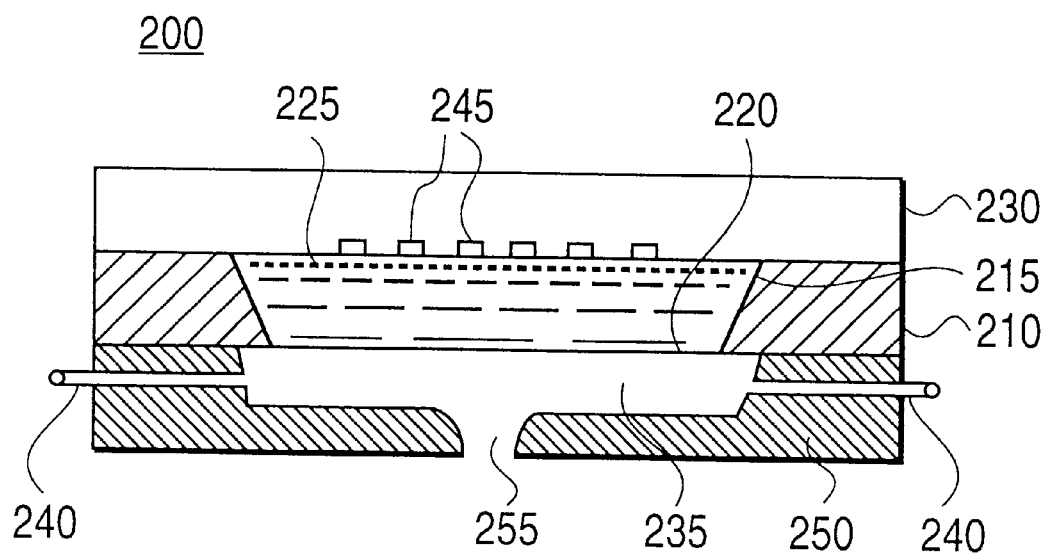
FIG. 2 illustrates a thermopneumatic actuator according to the invention.

FIG. 2 illustrates a thermopneumatic actuator 200 as a micromachined component of small external dimensions of a few cubic millimeters and a low weight of about 0.2 g. In the core, it comprises a silicon platelet 210 into which a recess 215 is etched. The base of the recess 215 is designed as a diaphragm 220. The recess 215 is filled with an operating liquid 225 with a high coefficient of thermal expansion. A ghost pyrex disk 230 with integrated heating resistor 245 forms the cover above the recess.

Beneath the diaphragm is a cavity 235 which is filled with air via the compressed-air feed line 240. At the bottom, the cavity is closed by a second pyrex disk 250. This second pyrex disk 250 beneath the cavity 235 has precise ducts 255 for allowing the air to leave.

If an electric voltage is applied to the first pyrex disk 230 with integrated heating resistor, the operating liquid 225 expands owing to the high coefficient of thermal expansion and presses the diaphragm 220 against the second pyrex disk 250. Due to the precise ducts 255, a controlled discharge of the compressed air is accomplished.

The throughput of compressed air is thus controlled by the movement of the extremely light diaphragm 220, which in turn is indirectly electrically driven. A mechanical build-up of oscillation as in the pneumatic level-control valve is therefore excluded in the thermopneumatic actuator 200.

It should be noted that although the details of a thermopneumatic actuator in the preferred embodiment are illustrated in FIG. 2, the present invention is not limited to that particular actuator. Any actuator known to one of ordinary skill in the art that can control a compressed-air feed line by an electric signal, falls within the scope of the present application.

Figure 1:
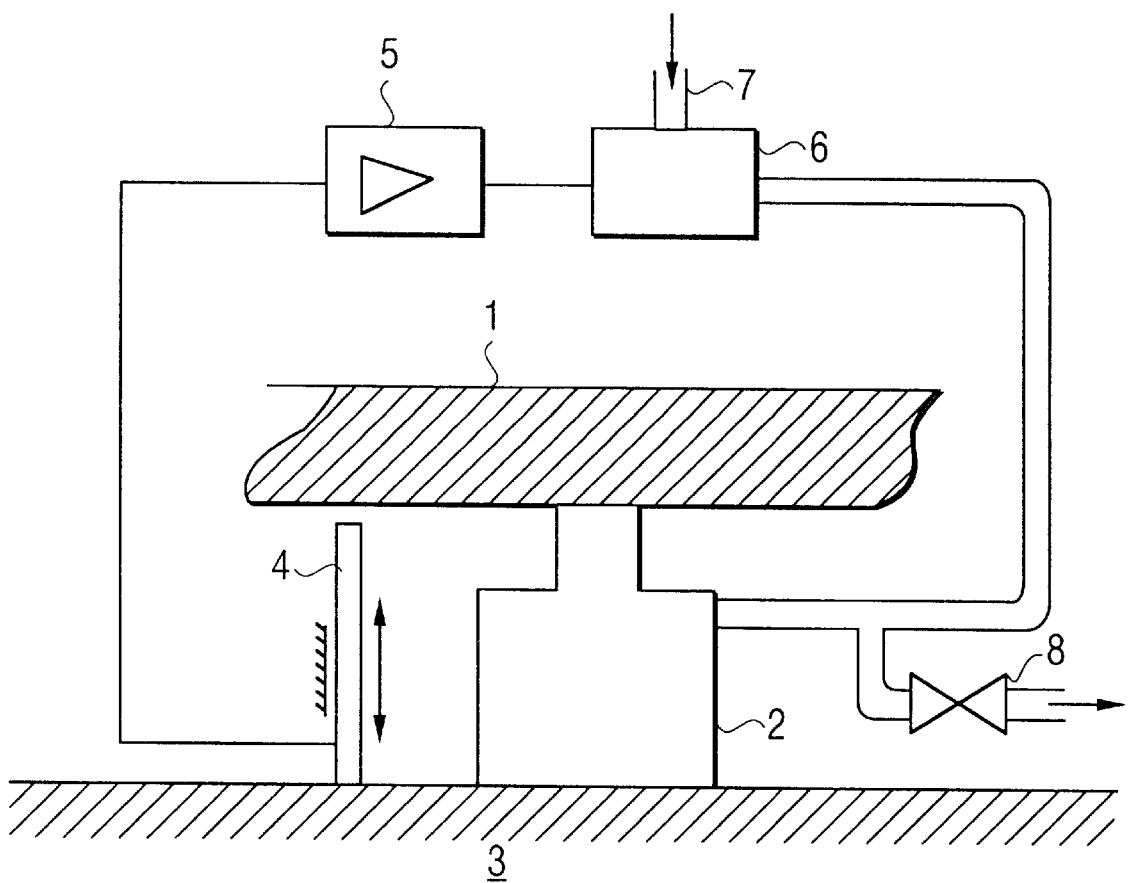
FIG. 1 is a schematic of the vibration isolation system according to an exemplary embodiment of the invention in which an object with mechanically isolated vibration isolation with level control is illustrated.

Referring now to FIG. 1, an object 1 for the purpose of vibration isolation is mounted on a pneumatic spring 2. The pneumatic spring 2 is positioned on a base 3. To determine the level of the object 1 above the base 3, an inductive sensor 4 is arranged as gap sensor between the object 1 and the base 3. In principle, any sensor which operates in a contact-free manner, as would be understood by one of ordinary skill in the art, is suitable for this application. As an alternative, it would also be possible, to use an optoelectronic, a magnetoresistive, or a capacitive sensor. The desired level is predetermined, for example, by a reference surface which is arranged on the underside of the object 1 and the level of which above the base 3 can be altered by means of a screw (not shown). This reference surface is, for example, an optical reflection surface when a reflected light barrier is used, a metallic surface when an inductive sensor is used or a magnetic surface when a magnetoresistive sensor is used.

Another embodiment includes a height adjustment of the sensor instead of the height-adjustable reference surface. Such a sensor still operates in a contact-free manner.

The inductive sensor 4 outputs a signal to the input of an electronic controller 5. The electronic controller 5 outputs a signal supplied to the electrical input of an electrically controllable flow valve 6 in the compressed-air feed line 7 of the pneumatic spring 2. The electrically controllable flow valve 6 is realized here by a thermopneumatic actuator as shown in FIG. 2.

Depending on the signal from electronic controller 5 (which is the input signal of the thermopneumatic actuator), the compressed-air feed to the pneumatic spring 2 is controlled. The inductive sensor 4, the electronic controller 5 and the thermopneumatic actuator form a control loop for controlling the level of the object 1 without mechanically moving parts and without a mechanical bypass to the base 3. If the pressure in the pneumatic spring 2 rises above a defined tolerance limit (i.e., in the event of decreasing the load of the object 1) a restrictor valve 8 provides the necessary venting.

The contact-free gap determination used here achieves true mechanical vibration isolation and avoids the mechanical coupling of previously known isolation systems with mechanical position detection. The use of a thermopneumatic actuator as an electrically controllable flow valve precludes a mechanical build-up of oscillation in the damping system. The electronic controller is used to perform both the level control and the setting of the control parameters. The invention thus combines true vibration isolation with the advantage of being able to select freely the control-circuit parameters which are most favorable for the respective application.

Other embodiments of the instant vibration isolation system will be apparent to those skilled in the art from consideration of the specification disclosed herein. It is intended that the specification be considered as exemplary only, with the true scope and spirit of the invention being indicated by the following claims.

The complete disclosure of the priority document, DE 196 28 974 2-33 filed Jul. 18, 1996, is hereby incorporated by reference.

What is claimed is:

1. A device for vibration isolation of an object, comprising:
   a pneumatic spring;
   a contact-free gap sensor;
   a controller; and
   an air flow valve comprising an electrically controllable thermopneumatic actuator;
   wherein the contact-free gap sensor senses a displacement of the object and outputs a signal to the controller, the controller actuates the electrically controllable thermopneumatic actuator thereby controlling the air flow to the pneumatic spring and correcting the displacement.

2. The device for vibration isolation according to claim 1, wherein the contact-free gap sensor comprises one of the following:
   an optoelectronic sensor, a magnetoresistive sensor, a capacitive sensor, and an inductive sensor.

3. A method for isolating an object from vibration comprising:
   contact-free sensing of a displacement from a current position of the object;
   electrically controlling a thermopneumatic actuator disposed to release an amount of air to a pneumatic spring in order to compensate for the displacement.

4. A device for vibration isolation of an object, comprising:
   a plurality of pneumatic springs disposed to determine bearing points;
   a plurality of contact-free gap sensors disposed to sense a displacement of the object;
   a controller, governed by an output signal from the plurality of contact-free gap sensors; and
   a plurality of air flow valves each having an electrically controllable thermopneumatic actuator;
   wherein the controller controls each of the electrically controllable thermopneumatic actuators thereby controlling an air flow to the plurality of pneumatic springs and correcting the displacement.

5. The device for vibration isolation according to claim 4, wherein the controller comprises a plurality of individual controllers, each individual controller controlling the electrically controllable thermopneumatic actuator corresponding to one of the plurality of pneumatic springs.

6. The device for vibration isolation according to claim 4, wherein each the plurality of contact-free gap sensors comprise one of the following:
   an optoelectronic sensor, a magnetoresistive sensor; a capacitive sensor, and an inductive sensor.

7. A device for the vibration isolation of an object with respect to a base, comprising:
   a pneumatic spring;
   a gap sensor determining a distance between the object and the base, wherein the gap sensor operates in a contact-free manner and having a gap sensor output signal;
   an electronic controller, driven by the gap sensor output signal and has a controller output signal; and
   an electrically controllable flow valve comprising a thermopneumatic actuator, driven by the controller output signal, incorporated in the compressed-air feed line of the pneumatic spring;
   wherein the gap sensor, the electronic controller, and the electrically controllable flow valve are arranged in a control loop.

8. The device for vibration isolation as claimed in claim 7, wherein the gap sensor operating in a contact-free manner comprises an optoelectronic sensor.

9. The device for vibration isolation as claimed in claim 7, wherein the gap sensor operating in a contact-free manner comprises a capacitive sensor.

10. The device for vibration isolation as claimed in claim 7, wherein the gap sensor operating in a contact-free manner comprises an inductive sensor.

11. A device for insulating an object against vibration from a base, consisting essentially of:
   a pneumatic spring;

a compressed air supply line;

a restrictor valve configured to provide venting;

a distance sensor configured to operate in a contact free manner and to output a distance sensor output signal corresponding to a distance between the object and the base;

an electronic controller, controlled by the distance sensor output signal, configured to output an electronic controller output signal; and a micromachined actuator, controlled by the electronic controller output signal, configured to operate as an electrically controllable valve in the compressed air supply line of the pneumatic spring.

12. The device according to claim 11, wherein the micromachined actuator is an actuator selected from the group consisting of a piezoelectric actuator, a thermopneumatic actuator, an electrostatic actuator, and a bimetallic actuator.

13. The device according to claim 12, wherein the micromachined actuator is a thermopneumatic actuator.

* * * * *